United States Patent
Tanaka et al.

(10) Patent No.: US 11,446,578 B2
(45) Date of Patent: Sep. 20, 2022

(54) INFORMATION PROCESSING PROGRAM, INFORMATION PROCESSING DEVICE, AND INFORMATION PROCESSING METHOD

(71) Applicant: PlatinumGames Inc., Osaka (JP)

(72) Inventors: Hiroto Tanaka, Osaka (JP); Ryoya Sakabe, Osaka (JP)

(73) Assignee: PLATINUMGAMES INC., Osaka (JP)

( * ) Notice: Subject to any disclaimer, the term of this patent is extended or adjusted under 35 U.S.C. 154(b) by 0 days.

(21) Appl. No.: 17/560,687

(22) Filed: Dec. 23, 2021

(65) Prior Publication Data

US 2022/0203233 A1 Jun. 30, 2022

(30) Foreign Application Priority Data

Dec. 28, 2020 (JP) .............................. JP2020-219381

(51) Int. Cl.
*A63F 13/537* (2014.01)
*A63F 13/525* (2014.01)
*A63F 13/57* (2014.01)

(52) U.S. Cl.
CPC .......... *A63F 13/537* (2014.09); *A63F 13/525* (2014.09); *A63F 13/57* (2014.09)

(58) Field of Classification Search
CPC ...... A63F 13/537; A63F 13/525; A63F 13/57; G06G 3/36
See application file for complete search history.

(56) References Cited

U.S. PATENT DOCUMENTS

| | | | | |
|---|---|---|---|---|
| 6,509,896 B1 * | 1/2003 | Saikawa | ................ | G06T 19/00 345/419 |
| 9,132,355 B2 * | 9/2015 | Terada | ................ | A63F 13/812 |
| 10,456,684 B2 * | 10/2019 | Hayashi | ............... | A63F 13/5258 |
| 10,792,567 B2 * | 10/2020 | Ogasawara | ........... | A63F 13/426 |
| 10,902,676 B2 * | 1/2021 | Bhuruth | ........... | H04N 21/21805 |
| 10,918,945 B2 * | 2/2021 | Azmandian | ............. | A63F 13/53 |

(Continued)

FOREIGN PATENT DOCUMENTS

| | | |
|---|---|---|
| EP | 2 754 470 | 7/2014 |
| JP | 5019897 | 9/2012 |

(Continued)

OTHER PUBLICATIONS

Extended European Search Report dated Jun. 15, 2022 in European Patent Application No. 21216482.6.

*Primary Examiner* — William H McCulloch, Jr.
(74) *Attorney, Agent, or Firm* — Wenderoth, Lind & Ponack, L.L.P.

(57) ABSTRACT

An information processing program is for improving operability of a player when aiming at one of a plurality of non-player objects. The information processing program causes a computer to function as: a camera control unit that controls an imaging range or an imaging direction of a virtual camera in a virtual space, a display control unit that causes a display unit to display an image taken by the virtual camera, an action control unit that controls an action of a player object in the virtual space according to an operation to an operating unit, and a setting unit that sets any one of the plurality of non-player objects other than the player object as a target object to aim at. The setting unit is capable of setting one of the plurality of non-player objects arranged outside the imaging range of the virtual camera as the target object.

11 Claims, 10 Drawing Sheets

(56) References Cited

U.S. PATENT DOCUMENTS

| | | | |
|---|---|---|---|
| 11,090,563 B2* | 8/2021 | Wu | A63F 13/537 |
| 11,103,782 B2* | 8/2021 | McCoy | H04N 21/4722 |
| 11,224,811 B2* | 1/2022 | Yu | A63F 13/798 |
| 2007/0270215 A1* | 11/2007 | Miyamoto | A63F 13/10 |
| | | | 463/32 |
| 2008/0125202 A1* | 5/2008 | Kamiyama | A63F 13/06 |
| | | | 463/43 |
| 2010/0069152 A1 | 3/2010 | Nishimura et al. | |
| 2011/0207532 A1* | 8/2011 | Terada | A63F 13/812 |
| | | | 463/31 |
| 2015/0306500 A1* | 10/2015 | Edsall | A63F 13/5255 |
| | | | 463/31 |
| 2016/0263479 A1* | 9/2016 | Yamagami | A63F 13/00 |
| 2016/0361649 A1* | 12/2016 | Hayashi | A63F 13/5255 |
| 2017/0368460 A1* | 12/2017 | Ceraldi | A63F 13/5258 |
| 2018/0193743 A1 | 7/2018 | Kitazono et al. | |
| 2019/0192967 A1* | 6/2019 | Ogasawara | A63F 13/25 |
| 2019/0287302 A1* | 9/2019 | Bhuruth | G06T 19/003 |
| 2020/0054947 A1* | 2/2020 | Wu | A63F 13/537 |
| 2020/0289935 A1* | 9/2020 | Azmandian | A63F 13/5258 |
| 2020/0384363 A1* | 12/2020 | Kyogoku | A63F 13/213 |
| 2020/0391111 A1* | 12/2020 | Yu | A63F 13/822 |
| 2021/0093969 A1* | 4/2021 | McCoy | G06N 3/084 |
| 2021/0407179 A1* | 12/2021 | Nishida | A63F 13/5252 |
| 2022/0051470 A1* | 2/2022 | Wei | G06T 7/70 |
| 2022/0080314 A1* | 3/2022 | Zhang | A63F 13/822 |
| 2022/0096928 A1* | 3/2022 | Wei | A63F 13/55 |
| 2022/0168646 A1* | 6/2022 | Liu | A63F 13/57 |

FOREIGN PATENT DOCUMENTS

| | | |
|---|---|---|
| JP | 2018-110629 | 7/2018 |
| JP | 2019-136358 | 8/2019 |
| WO | 2013/035330 | 3/2013 |

* cited by examiner

*Fig. 4*

| Priority | Specific range IR | Imaging range CR | Non-battle region R1 |
|---|---|---|---|
| 1 | IN | IN | IN |
| 2 | OUT | IN | IN |
| 3 | IN | OUT | IN |
| 4 | OUT | OUT | IN |
| 5 | - | - | OUT |

*Fig. 6*

| Priority | Specific range IR | Imaging range CR | Type | Battle region R2 |
|---|---|---|---|---|
| 1 | IN | IN | Enemy | IN |
| 2 | OUT | IN | Enemy | IN |
| 3 | IN | IN | Material | IN |
| 4 | IN | OUT | Enemy | IN |
| 5 | OUT | OUT | Enemy | IN |
| 6 | IN | OUT | Material | IN |
| 7 | OUT | IN | Material | IN |
| 8 | OUT | OUT | Material | IN |

INFORMATION PROCESSING PROGRAM, INFORMATION PROCESSING DEVICE, AND INFORMATION PROCESSING METHOD

BACKGROUND

1. Technical Field

The present invention relates to an information processing program, an information processing device, and an information processing method.

2. Related Art

Conventionally, in action games, shooting games, and the like, there are known games in which one non-player object is set as aim and locked (so called, lock on) from among a plurality of non-player objects (targets) that are the attack targets for a player object (for example, see JP-A-2019-136358 and JP5019897).

However, in the above-described games in JP-A-2019-136358 and JP5019897, only the non-player object displayed on a game screen (which is arranged within an imaging range of a virtual camera) can be locked on, and the non-player object not displayed on the game screen (which is arranged outside the imaging range of the virtual camera) cannot be locked on. Therefore, an operability of the player is not necessarily high with respect to locking on the target.

The present invention has been developed in view of the above situation. The present invention provides an information processing program or the like, which improves the operability of the player when aiming at one of the plurality of non-player objects.

SUMMARY

The information processing program according to an example of the present invention is an information processing program for causing a computer of an information processing device to execute an information process according to an operation to an operating unit and cause a display unit to display an image, the program causing the computer to function as: a camera control unit that controls an imaging range or an imaging direction of a virtual camera in a virtual space; a display control unit that causes the display unit to display an image taken by the virtual camera; an action control unit that controls an action of a player object in the virtual space according to the operation to the operating unit; and a setting unit that sets any one of a plurality of non-player objects other than the player object as a target object to aim. The setting unit is capable of setting the non-player object arranged outside the imaging range of the virtual camera as the target object, and the action control unit controls the action of the player object such that a predetermined effect acts on the target object when the non-player object arranged outside the imaging range of the virtual camera is set as the target object.

Another example of the present invention may be an information processing device to execute the information processing program described above, and may be an information processing method performed by the above-described information processing device.

The present invention improves the operability of the player when aiming at one of the plurality of non-player objects.

BRIEF DESCRIPTION OF DRAWINGS

FIG. 4 is a diagram illustrating an example of a priority setting table when out of battle;

FIG. 6 is a diagram illustrating an example of a priority setting table when in battle;

DETAILED DESCRIPTION

The following describes the embodiment of the present invention with reference to the drawings.

An information processing program according to the embodiment is applied to action game programs. The action game according to this embodiment proceeds by operations of the player object in a virtual space (game space) to attack and defeat enemy objects that appear in the virtual space. When attacking the enemy objects, the player object attacks one object that is aimed at and locked as an attack target from among the plurality of objects including the enemy objects. In the following descriptions, "lock on" may be used to mean to aim at and lock onto one of the plurality of objects as the attack target.

Figure 1:
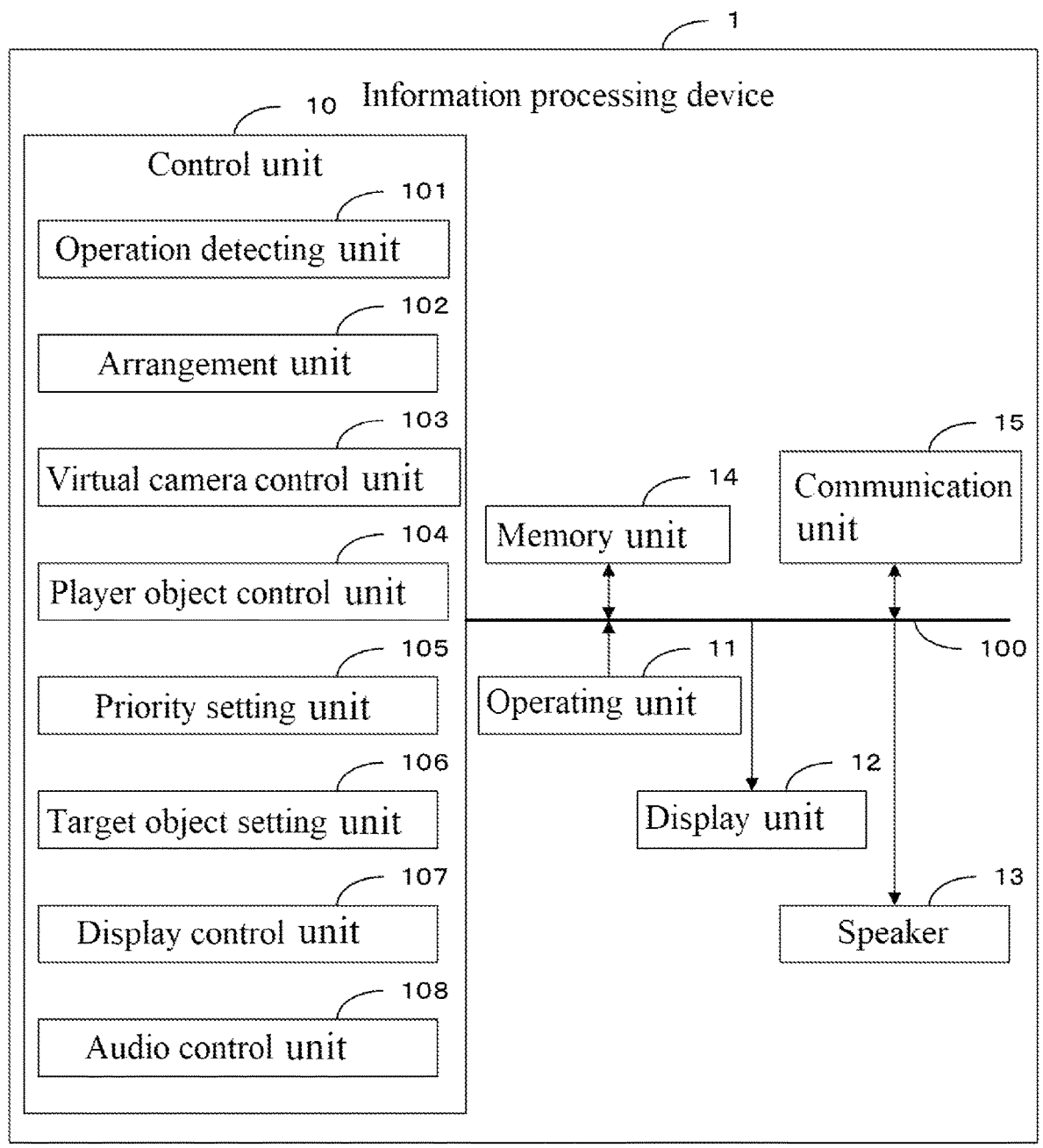
FIG. 1 is a diagram illustrating a configuration of an information processing device according to one embodiment of the present invention.

First, with reference to FIG. 1, a hardware configuration and a functional configuration of an information processing device 1 will be described. FIG. 1 illustrates an example of a configuration of the information processing device 1 to perform the information processing program according to the embodiment.

(Hardware Configuration of Information Processing Device 1)

The information processing device 1 is a portable terminal device, such as a smart phone and a portable game device, and includes a control unit 10, an operating unit 11, a display unit 12, a speaker 13, a memory unit 14, and a communication unit 15.

The operating unit 11, the display unit 12, the speaker 13, the memory unit 14, and the communication unit 15 are connected to the control unit 10 via a bus 100.

The control unit 10 is composed of a Central Processing Unit (CPU) and performs various game processes of the information processing device 1 according to the game programs and various game data stored in the memory unit 14.

The operating unit 11 and the display unit 12 are superimposed to function as a touch panel.

The operating unit 11 is composed of a capacitive or resistive (pressure sensitive) position input sensor to output an operation signal based on a player's touch operation. The touch operation is an operation for causing an operating body, such as a player's finger and a stylus pen, to contact or approach a touch panel. The touch operation includes: a tap operation for causing the operating body to contact or approach the touch panel once and then to release the contacting or approaching from the touch panel immediately; a swipe operation for causing the operating body to contact or approach the touch panel and then to slide the operating body therefrom directly in a predetermined direction; and the like.

The display unit 12 is composed of a display such as a liquid crystal and displays images or the like for a game.

The speaker 13 outputs game sounds and the like.

The memory unit 14 is composed of a Read Only Memory (ROM) and a Random Access Memory (RAM), and stores game programs and various game data for executing the game.

The communication unit 15 transmits and receives data to and from a server apparatus (not illustrated) through communication via network, such as Internet, a mobile phone network, a Local Area Network (LAN). Thus, game programs and various game data are distributed from the server apparatus to the information processing device 1, thus causing the memory unit 14 of the information processing device 1 to store the distributed data for the game programs and various game. The communication unit 15 may be capable of transmitting and receiving data to and from other information processing device 1.

(Functional Configuration of Information Processing Device 1)

As shown in FIG. 1, the control unit 10 (CPU) of the information processing device 1 executes the game programs distributed by the server apparatus and stored in the memory unit 14 to function as an operation detecting unit 101, an arrangement unit 102, a virtual camera control unit 103, a player object control unit 104, a priority setting unit 105, a target object setting unit 106, a display control unit 107, and an audio control unit 108.

The operation detecting unit 101 detects operation signals output according to the touch operation on the operating unit 11 (touch panel). When detecting the operation signals, the operation detecting unit 101 identifies an operation detail, for example, in which region of the touch panel the tap operation or swipe operation is performed.

In the virtual space (game space), the arrangement unit 102 arranges a player object operated by the player, and non-player objects (enemy objects and material objects as described later) other than the player object, together with the virtual camera taking the virtual space. The arrangement unit 102 controls actions of the non-player objects and changes the arrangements of the non-player objects in the virtual space.

The virtual camera control unit 103 controls the imaging range (the range equivalent to an angle of view of the virtual camera) and the imaging direction (direction of the virtual camera) of the virtual camera in the virtual space. The display unit 12 display an image corresponding to the imaging range captured by the virtual camera in the virtual space.

The player object control unit 104 controls actions of the player object (move, attack, and the like) according to the operation signals detected by the operation detecting unit 101.

The priority setting unit 105 sets a priority for each of plurality of non-player objects arranged by the arrangement unit 102.

The target object setting unit 106 compares the priorities of the plurality of non-player objects set by the priority setting unit 105 and sets the non-player object with the highest priority as the locked-on target. In the following descriptions, the non-player object as the locked-on target may be referred to as the "target object". In addition, an aim image is superimposed and displayed on the target object so as to be recognized that the object is locked on.

The display control unit 107 generates an image taken by the virtual camera arranged in the virtual space and performs the control process to cause the display unit 12 to display the generated image.

The audio control unit 108 produces a game sound such as music, sound effects, and character voices to perform the control process to cause the speaker 13 to output the produced sounds.

(Game Overview)

Figure 2A:
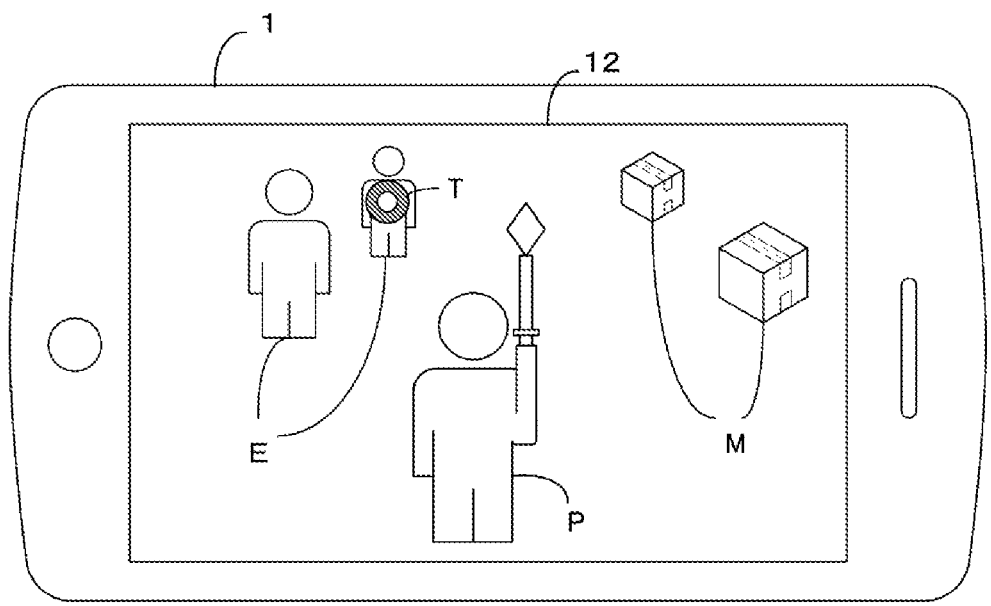
FIGS. 2A and 2B are diagrams for describing a game overview according to one embodiment of the present invention.
Figure 2B:
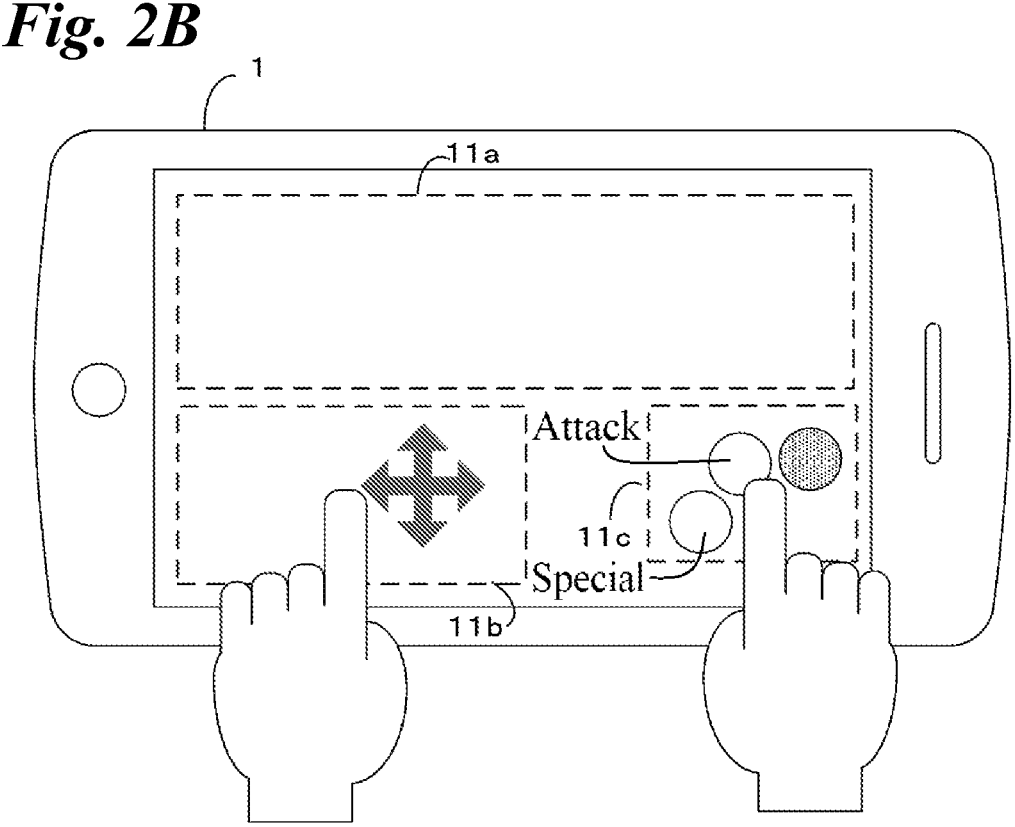

Next, with reference to FIGS. 2A and 2B, an overview of the action game executed by the information processing device 1 will be described. FIG. 2A illustrates an example of a game screen displayed on the display unit 12 constituting the touch panel. FIG. 2B illustrates an example of a game operation on the operating unit 11 constituting the touch panel.

As shown in FIG. 2A, in the action game of this embodiment, the display unit 12 mainly displays the player object P operated by the player, movable enemy objects E, and static material objects M, the enemy objects E and material objects M are non-player objects other than the player object P.

The player operates the player object P to attack and defeat enemy objects E and also attacks and destroys material objects M to acquire items, thus advancing through the game. The plurality of the non-player objects are arranged around the player object P, and the player locks onto any one of the plurality of non-player objects with a predetermined operation (a specific operation as described later). Which one to lock on to is determined based on the priority set for each of plurality of non-player objects, and the detail of which will be described later.

The aim image T is superimposed and displayed on the locked-on non-player object (target object) so as to be recognized that the object is locked on. Then, the player's attack operation causes the player object P to perform attack actions against the target object on which the aim image T is superimposed and displayed. Specifically, when the target object is the enemy object E, the attack actions reduce a life gauge of the enemy object E, and when the target object is the material object M, the attack actions destroy the material object M.

In the action game in this embodiment, a game status is switched from "Out of battle" to "In battle" at a predetermined timing. When the game status is switched to the "In battle", the moving range of the player object P is limited to a predetermined range in the virtual space (within the battle region R2 as described later with reference to FIG. 5A). When the game status is "Out of battle", no enemy objects E are arranged as the non-player object around the player object P. In contrast, when the game status is "In battle", enemy objects E are arranged as the non-player objects around the player object P. The detail of the non-player object arrangements when the game status is "Out of battle" and "In battle" will be described later using FIGS. 3A, 3B, 5A, and 5B.

As shown in FIG. 2B, in the operating unit 11 constituting the touch panel, a touch operation detecting area for detecting touch operations is classified into a first region 11a, a second region 11b, and a third region 11c.

In the first region 11a, when the touch operation is detected, the imaging direction and the imaging range of the virtual camera are changed based on the touch operation. Specifically, the imaging direction of the virtual camera is changed in alignment with the sliding direction in the swipe operation based on the swipe operation.

In the second region 11b, when the touch operation is detected, the moving direction of the player object P is controlled based on the touch operation. Specifically, the movement of the player object P is controlled in alignment with the sliding direction in the swipe operation based on the swipe operation.

In the third region 11c, a plurality of images such as an icon image indicating "Attack" are displayed in its corresponding area of the display unit 12. In the third region 11c, the player object P performs an action indicated by the icon image based on the tap operation by touching the icon image. For example, the player object P attacks the target object based on the tap operation by touching the icon image indicating "Attack". In this embodiment, it is also possible to lock on any one of the plurality of non-player objects based on the tap operation by touching the icon image indicating "Attack".

Accordingly, the player performs: the swipe operation in the first region 11a for changing the imaging direction of the virtual camera to change the display screen; the swipe operation in the second region 11b for moving the player object P; and the tap operation on the icon image indicating "Attack" in the third region 11c for locking onto any one of the plurality of non-player objects and attacking the locked-on target object, thus advancing through the game.

(Arrangement Example of Virtual Camera and Non-Player Objects in "Out of Battle")

Figure 3A:
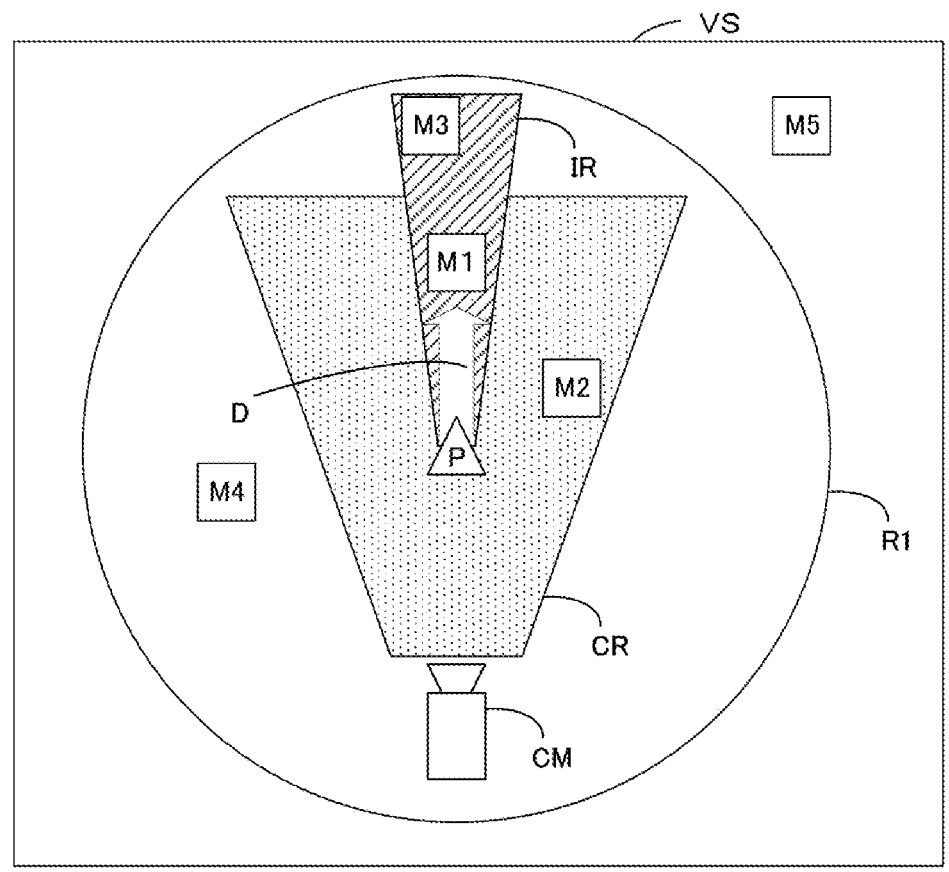
FIGS. 3A and 3B are diagrams for describing an example of a virtual camera and object arrangements and a display screen when out of battle.
Figure 3B:
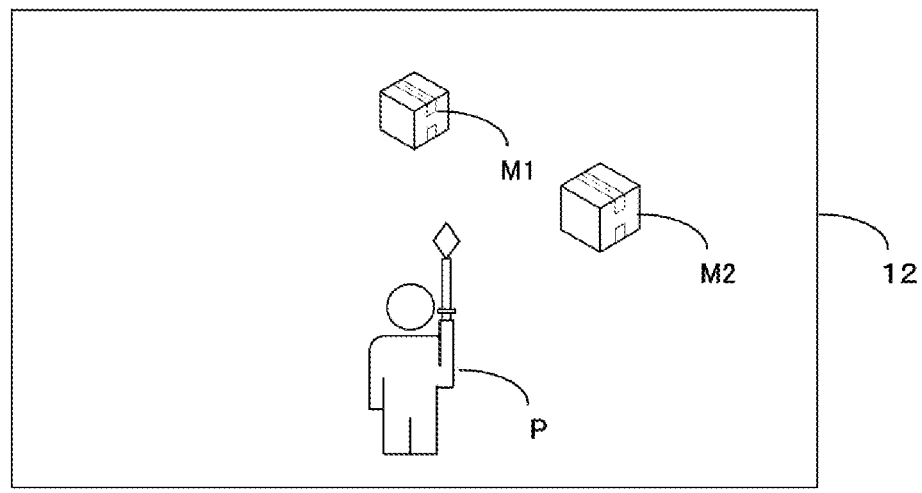

Next, with reference to FIGS. 3A and 3B, an example of the arrangements of the virtual camera and non-player objects in "Out of battle", and an example of the display screen on the display unit 12 therein will be described. FIG. 3A illustrates an example of the arrangements of the virtual camera and non-player objects in "Out of battle". FIG. 3B illustrates an example of the display screen on the display unit 12 in the arrangements in FIG. 3A.

As shown in FIG. 3A, the player object P, and material objects M1 to M5 as non-player objects are arranged, and the virtual camera CM is arranged in a rear of the player object P in the virtual space VS. Note that, the enemy objects E are not arranged as non-player objects in "Out of battle".

Among the material objects M1 to M5 as non-player objects, the material objects M1 to M4 are arranged within a specific distance centered on the player object P. Namely, the material objects M1 to M4 are arranged within the circular non-battle region R1 having the specific distance with the radius centered on the player object P, while the material object M5 is arranged outside the non-battle region R1.

Among the material objects M1 to M5, the material objects M1, M2 are arranged within the imaging range CR of the virtual camera CM, while the material objects M3 to M5 are arranged outside the imaging range CR. The player object P is arranged within the imaging range CR.

Among the material objects M1 to M5, the material objects M1 and M3 are arranged within a specific range IR centered on a player input direction (direction illustrated as the arrow D in FIG. 3A) as the center axis, while the material objects M2, M4, and M5 are arranged outside the specific range IR. Here, the player input direction is a sliding direction to which the player swipes in the second region 11b of the operating unit 11, thus corresponding to the moving direction of the player object P. The specific range IR, for example, is set within a range of ±10 degrees with respect to the player input direction as the center axis. The range may be configured as necessary according to the number of non-player objects to be arranged or the like.

As shown in FIG. 3A, the non-battle region R1 is set as a region broader than the imaging range CR so as to include the imaging range CR. The non-battle region R1 may be a specific range, or may be determined arbitrarily according to player's operations.

When the non-player objects are arranged around the player object P as shown in FIG. 3A, the player object P and the material objects M1 and M2 within the imaging range CR are displayed on the display unit 12 as shown in FIG. 3B.

(Out of Battle Priority Setting Table)

Next, with reference to FIG. 4, the out of battle priority setting table to be referenced for a setting priority for each of plurality of non-player objects during "Out of battle" will be described. FIG. 4 illustrates an example of the out of battle priority setting table.

As shown in FIG. 4, in the out of battle priority setting table, the priorities are set based on three reference axes of the specific range IR, the imaging range CR, and the non-battle region R1. For example, when the non-player object is arranged within the non-battle region R1, the imaging range CR, and outside the specific range IR, the non-player object is set to the second highest priority "2" as the priority corresponding to the arrangement of the non-player object, with reference to the out of battle priority setting table as shown in FIG. 4.

Accordingly, in the example of FIG. 3A, the highest priority "1" is set to the material object M1 arranged within the non-battle region R1, the imaging range CR, and the specific range IR. The second highest priority "2" is set to the material object M2 arranged within the non-battle region R1 and the imaging range CR, and outside the specific range IR. The third highest priority "3" is set to the material object M3 arranged within the non-battle region R1, outside the imaging range CR, and within the specific range IR. The fourth highest priority "4" is set to the material object M4 arranged within the non-battle region R1, and outside the imaging range CR and the specific range IR. The lowest priority "5" is set to the material object M5 arranged outside the non-battle region R1. In view of this, the material object M1 set to the highest priority is set as the target object among the plurality of non-player objects (material objects M1 to M5) in the example of FIG. 3A.

(Example of Virtual Camera and Non-Player Object Arrangements in Battle)

Figure 5A:
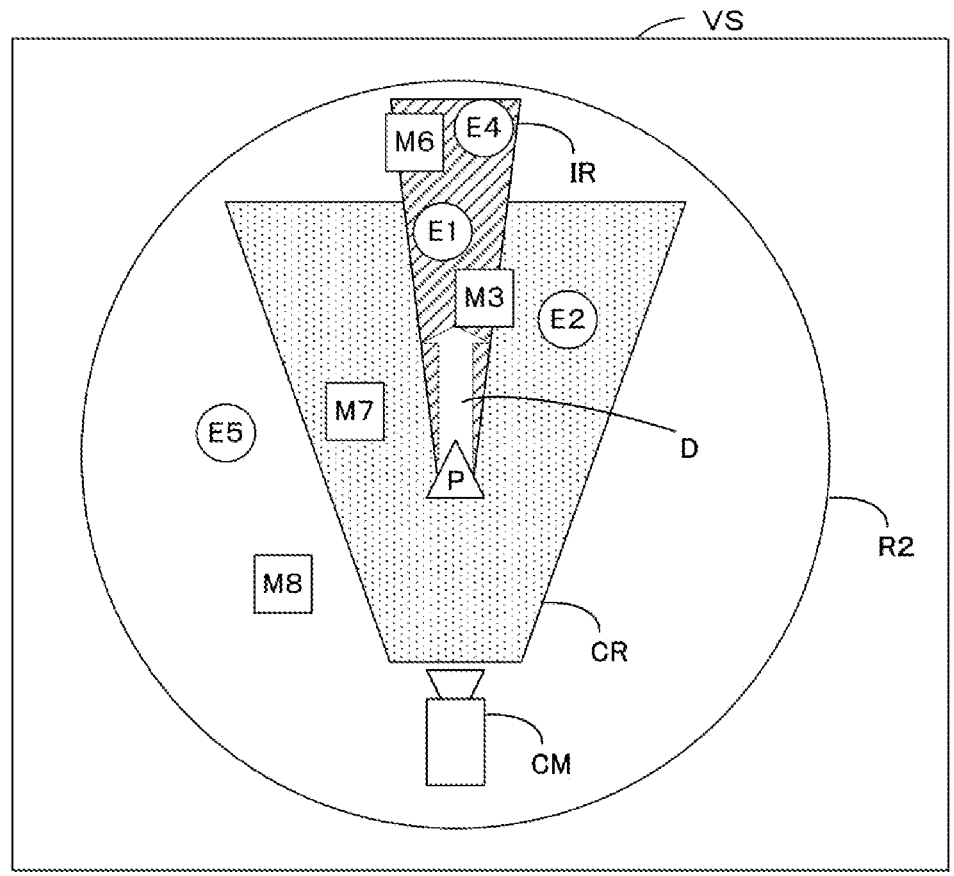
FIGS. 5A and 5B are diagrams for describing an example of a virtual camera and object arrangements and a display screen when in battle.
Figure 5B:
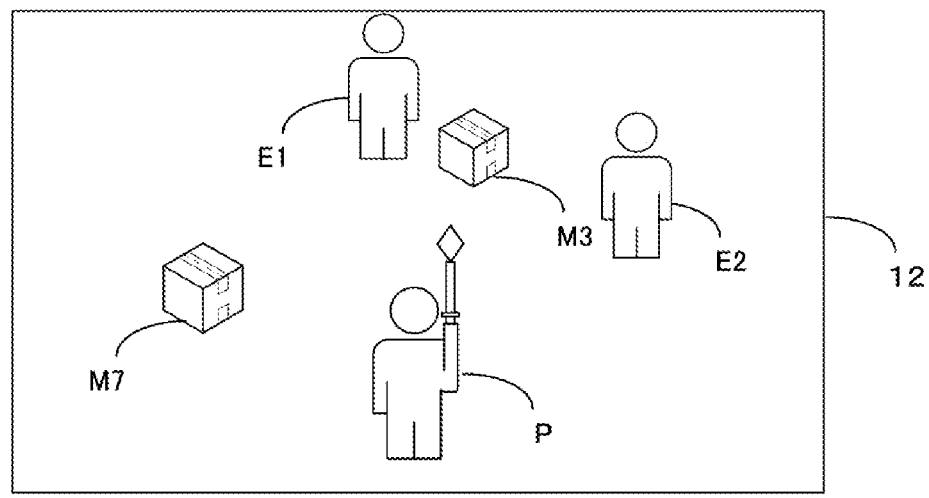

Next, with reference to FIGS. 5A and 5B, an example of the arrangements of the virtual camera and non-player objects in battle, and the display screen displayed on the display unit 12 at this time will be described. FIG. 5A illustrates one example of the virtual camera and non-player objects arrangements in battle. FIG. 5B illustrates one example of the display screen displayed on the display unit 12 with the arrangements in FIG. 5A.

As shown in FIG. 5A, the player object P, and enemy objects E1, E2, E4, E5 and material object M3, M6, M7, M8 as non-player objects are arranged, and the virtual camera CM is arranged in the rear of the player object P, in the virtual space VS.

Further, during "In battle", the battle region R2 centered on the player object P is formed, and the moving range of the player object P is limited to the battle region R2. In this embodiment, the battle region R2 is automatically formed when a predetermined condition is satisfied, specifically, when the status is switched from "Out of battle" to "In battle". The battle region R2 is, for example, a circular region centered on the player object P, and may be also a variable region changed as necessary according to a terrain or the like where the player object P and non-player objects are arranged. The battle region R2 is set as a region broader than the imaging range CR so as to include the imaging range CR of the virtual camera CM.

During "In battle", the non-player objects are all arranged within the battle region R2 because the moving range of the player object P is limited within the battle region R2 during "In battle".

Among the non-player objects, the enemy objects E1, E2 and the material object M3, M7 are arranged within the imaging range CR of the virtual camera CM, while the enemy objects E4, E5 and the material object M6, M8 are arranged outside the imaging range CR. The player object P is arranged within the imaging range CR.

Further, among the non-player objects, the enemy objects E1, E4 and the material object M3, M6 are arranged within the specific range IR about the player input direction (direction illustrated as the arrow D in FIG. 5A) as the center axis, while the enemy objects E2, E5 and the material object M7, M8 are arranged outside the specific range IR.

When the non-player objects are arranged around the player object P as shown in FIG. 5A, the display unit 12 displays the player object P, the enemy objects E1, E2 and the material objects M3, M7 arranged within the imaging range CR as shown in FIG. 5B.

(In Battle Priority Setting Table)

Next, with reference to FIG. 6, an in battle priority setting table referenced for a setting priority for each of plurality of non-player objects during "In battle" will be described. FIG. 6 illustrates one example of the onside of battle priority setting table.

As shown in FIG. 6, in the in battle priority setting table, the priorities are set based on four reference axes of the specific range IR, the imaging range CR, types of the non-player objects (enemy objects or material objects), and the battle region R2. However, as described above, all the non-player objects are arranged within the battle region R2 during "In battle". For example, when the type of the non-player object is the enemy object and arranged within the battle region R2 and the imaging range CR, and outside the specific range IR, the non-player object is set to the second highest priority "2" corresponding to the type and arrangement of the non-player object, with reference to the in battle priority setting table shown in FIG. 6.

Accordingly, in the example of FIG. 5A, the highest priority "1" is set to the enemy object E1 arranged within the battle region R2, the imaging range CR, and the specific range IR. The second highest priority "2" is set to the enemy object E2 arranged within the battle region R2 and the imaging range CR, and outside the specific range IR. The third highest priority "3" is set to the material object M3 arranged within the battle region R2, the imaging range CR, and the specific range IR. The fourth highest priority "4" is set to the enemy object E4 arranged within the battle region R2, outside the imaging range CR, and within the specific range IR. The fifth highest priority "5" is set to the enemy object E5 arranged within the battle region R2, and outside the imaging range CR and the specific range IR. The sixth highest priority "6" is set to the material object M6 arranged within the battle region R2, outside the imaging range CR, and within the specific range IR. The seventh highest priority "7" is set to the material object M7 arranged within the battle region R2 and the imaging range CR, and outside the specific range IR. The lowest priority "8" is set to the material object M8 arranged within the battle region R2, and outside the imaging range CR and the specific range IR. In view of this, the enemy object E1 with the highest priority is set as the target object among the plurality of the non-player objects in the example of FIG. 5A.

(Aim Setting Process)

Figure 7:
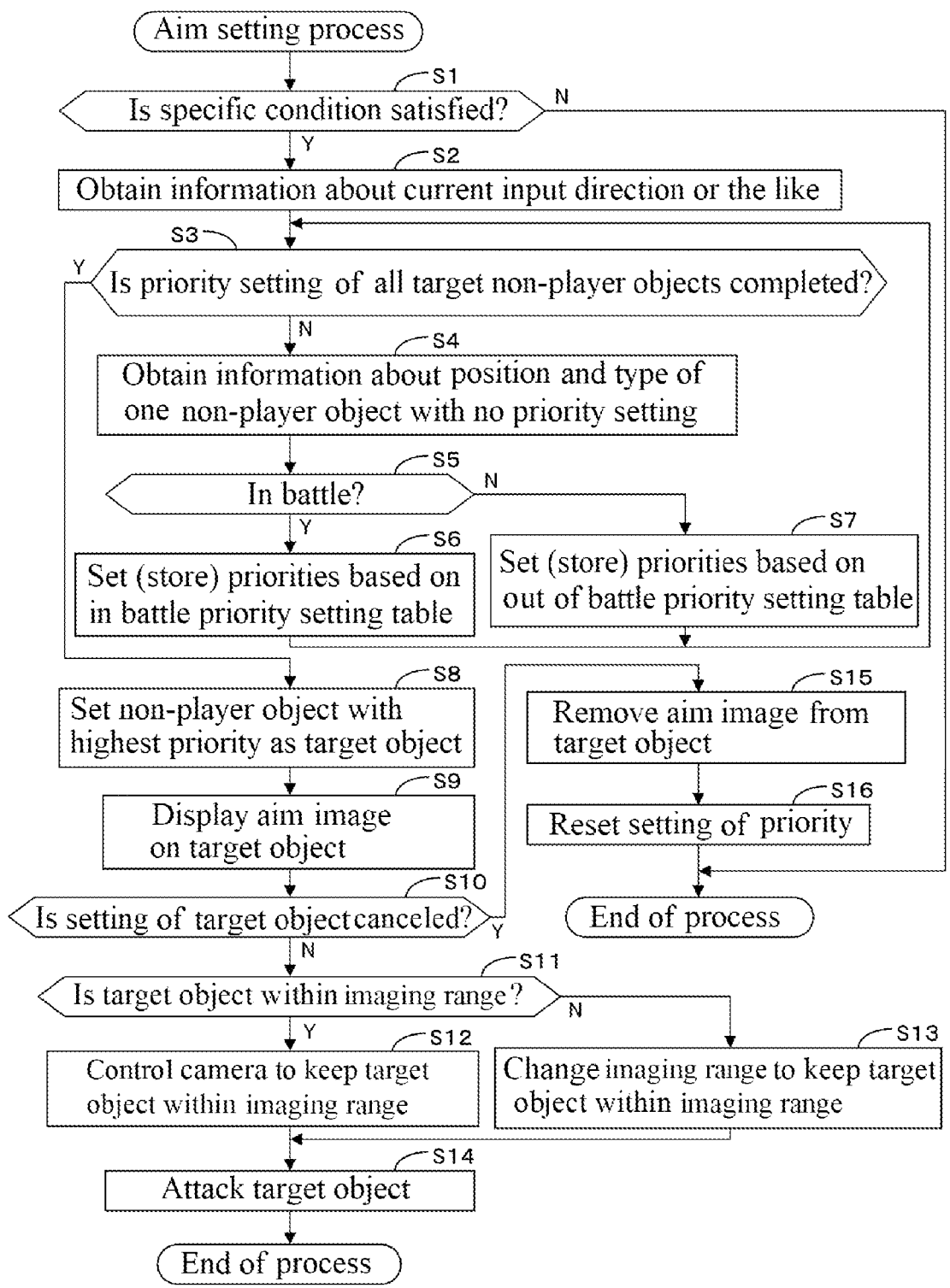
FIG. 7 is a flowchart illustrating an example of an aim setting process performed by the information processing device.

Next, with reference to FIG. 7, the aim setting process performed by the control unit 10 (CPU) of the information processing device 1 having the functional configuration in FIG. 1 will be described. The aim setting process includes a process for setting one of the plurality of non-player objects as the target object, a process for displaying the aim image superimposed on the set target object, and the like. The aim setting process as shown in FIG. 7 is to describe distinctive processes in this embodiment, not to eliminate other processes required in game processing.

In Step S1, the operation detecting unit 101 determines whether a specific condition is satisfied. Here, the satisfied specific condition means that the player performs the tap operation to lock on one non-player object by touching the icon image indicating "Attack" in the third region 11c of the operating unit 11. In the following descriptions, the operation to lock on may be also referred to as the specific operation. When the operation detecting unit 101 determines that the operation signal output from the operating unit 11 indicates that the specific operation is performed (Step S1; YES), the process proceeds to Step S2, and when the operation detecting unit 101 determines that the operation signal does not indicate that the specific operation is performed (Step S1; NO), the process ends.

In Step S2, the operation detecting unit 101 identifies the player input direction by detecting the swipe operation in the second region 11b of the operating unit 11, and stores the specific range IR about the player input direction as the center axis in the memory unit 14. Note that, the player input direction controls the moving direction of the player object P. Further, in Step S2, the virtual camera control unit 103 stores the imaging range CR of the current virtual camera CM in the memory unit 14.

In Step S3, the priority setting unit 105 determines whether the priority settings of all the target non-player objects are completed. Here, all the target non-player objects mean the enemy objects E and the material objects M arranged around the player object P in the virtual space VS. Note that, when the priorities are set to the non-player objects, the memory unit 14 stores the priorities associated with the non-player objects. Accordingly, the priority setting unit 105 determines whether there is any non-player object whose priority is not associated and stored in the memory unit 14. When the priority setting unit 105 determines that there is a non-player object not associated with priority in the memory unit 14 (that is, the priority settings for all the non-player objects are not completed.) (Step S3; NO), the process proceeds to Step S4. When the priority setting unit 105 determines that there is no non-player object without association with priority in the memory unit 14 (that is, the priority settings of all the non-player objects are completed.) (Step S3; YES), the process proceeds to Step S8.

In Step S4, the priority setting unit 105 selects one non-player object not associated with priority in the memory unit 14 among the target non-player objects, and obtains information about the position where the non-player object is arranged and the type of the non-player object (enemy object or material object).

In Step S5, the priority setting unit 105 determines whether the current game status is "In battle". Note that, whether the current game status is "In battle" may be determined by, for example, whether the display control unit 107 displays the background in battle mode or the like indicating that the game is during "In battle". When the priority setting unit 105 determines that the current game status is "In battle" (Step S5; YES), the process proceeds to Step S6. When the status is determined to be not "In battle" (that is, "Out of battle") (Step S5; NO), the process proceeds to Step S7.

In Step S6, according to information about the position and the type of the non-player objects obtained in Step S4 and the in battle priority setting table in FIG. 6, the priority setting unit 105 sets priorities to the non-player objects and stores the priorities associated with the non-player objects in the memory unit 14.

In Step S7, according to information about the position and the type of the non-player objects obtained in Step S4, and the out of battle priority setting table in FIG. 4, the priority setting unit 105 sets priorities to the non-player objects and stores the priorities associated with the non-player objects in the memory unit 14.

The processes from Steps S4 to S7 are repeated until it is determined to be YES in Step S3 (namely, until the priority setting for all the non-player objects is completed).

In Step S8, the target object setting unit 106 sets the non-player object associated with the highest priority among the priorities stored in the memory unit 14 as the target object.

In Step S9, the display control unit 107 displays the aim image T to be superimposed on the target object.

In Step S10, the display control unit 107 determines whether the setting of the target object is canceled. The target object setting is canceled when the target object is attacked in the process of step S14 described later and the target object is defeated as a result of a predetermined number of attacks (for example, the life gauge is reduced to 0). The setting of the target object may be canceled by a predetermined canceling operation by the player. When the display control unit 107 determines that the setting of the target object is canceled (Step S10; YES), the process proceeds to Step S15. When the setting of the target object is determined to be not canceled (Step S10; NO), the process proceeds to Step S11.

In Step S11, the virtual camera control unit 103 determines whether the target object is arranged within the imaging range CR of the virtual camera CM. When the virtual camera control unit 103 determines that the target object is arranged within the imaging range CR (Step S11; YES), the process proceeds to Step S12. When the target object is determined to be arranged outside the imaging range CR (Step S11; NO), the process proceeds to Step S13.

In Step S12, the virtual camera control unit 103 controls the imaging range or the imaging direction of the virtual camera CM such that the target object within the imaging range CR remains to be included therein. Accordingly, the target object is included within the imaging range CR unless the setting of the target object is canceled, which allows the target object constantly to be displayed on the display screen of the display unit 12. In view of this, the player can continue to view the target object at all times while operating the player object P.

In Step S13, the virtual camera control unit 103 changes the imaging range or the imaging direction of the virtual camera CM such that the target object outside the imaging range CR is included within the imaging range CR. In view of this, the target object is included within the imaging range CR, followed by the sudden appearance of the non-player objects as the target object in the display screen of the display unit 12, where the non-player objects were not displayed until then. Accordingly, the player can easily lock on the on-screen non-player objects not in the player's view and confirm the locked-on target object while operating the player object P.

In Steps S12 and S13, the virtual camera control unit 103 controls the imaging range or the imaging direction of the virtual camera CM such that not only the target object but also the player object P are included within the imaging range CR. In some embodiments, the player object P may not be included within the imaging range CR.

In Step S14, the player object control unit 104 causes the player object P to attack the target object, then the process ends. Thus, the player object control unit 104 controls the actions of the player object P such that the predetermined effect acts on the target object when the target object arranged outside the imaging range CR is locked on based on the specific operation. Specifically, when the target object is the enemy object E, the attack operation of the player object P is executed to reduce the life gauge of the enemy object E, and when the target object is the material object M, the attack operation of the player object P is executed to destroy the material object M. As described above, since the specific operation is an operation for locking on and at the same time a tap operation to touch the icon image indicating "Attack" in the third region 11c of the operating unit 11, the specific operation also functions as the attack operation. In view of this, in Step S14, the attack actions on the target object are executed with the determination that the specific operation (also serving as the attack operation in this embodiment) is performed in Step S1.

By the processes from Steps S10 to S14, the target object is constantly displayed on the display screen of the display unit 12 until the target object setting is canceled (for example, the target object is defeated), and it becomes possible to attack the target object.

In Step S15, when the target object is defeated, the virtual camera control unit 103 removes the aim image T accordingly. When the target object is not defeated (for example, when the player performs the predetermined canceling operation), only the aim image T is removed.

In Step S16, the priority setting unit 105 resets the settings of the priority stored in the memory unit 14 in Step S6 or S7, then the process ends.

As described above, the player can continuously set (lock on) the target object and attack the target object only by performing the specific operation (which is also the attack operation in the present embodiment) once. The operability of the player can be improved.

While the process ends after the attack operation is executed on the target object in Step S14 in this embodiment, for example, the following process may alternatively be executed. That is, when the plurality of non-player objects are present, after the attack on the target object is completed in Step S14 (the target object is defeated (for example, the life gauge is reduced to 0) or the material object as the target object is destroyed), the process returns to Step S8 to set the non-player object having the second highest priority as the target object. Then, in Step S9, the aim is displayed on the target object, a process to determine whether any attack operation is added after Step S10, and when the attack operation is performed, the attack operation is executed in Step S14. These processes from Step S8 to Step S14 may be repeated until all the non-player objects are removed.

(Example of Locking on a Non-Player Objects on Screen During "in Battle")

Figure 8A:
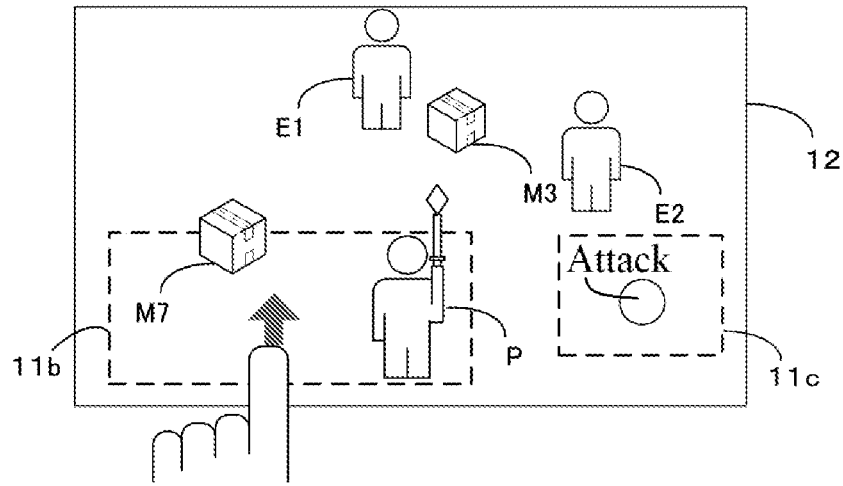
FIGS. 8A, 8B, and 8C are diagrams for describing an example of a target object setting for an on-screen non-player object when in battle.
Figure 8B:
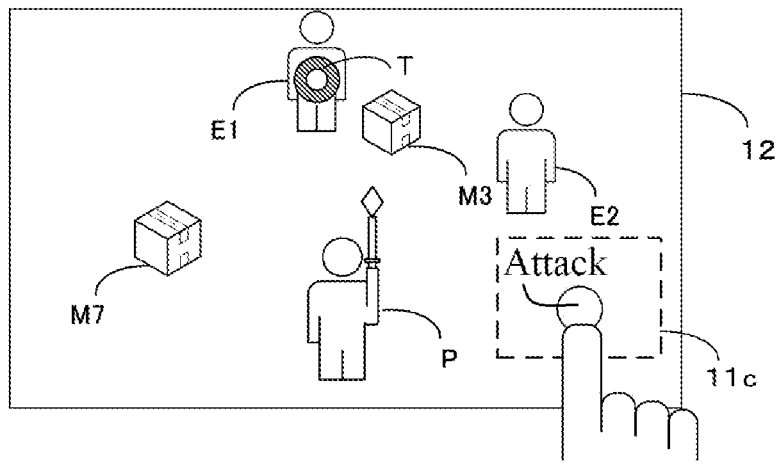
Figure 8C:
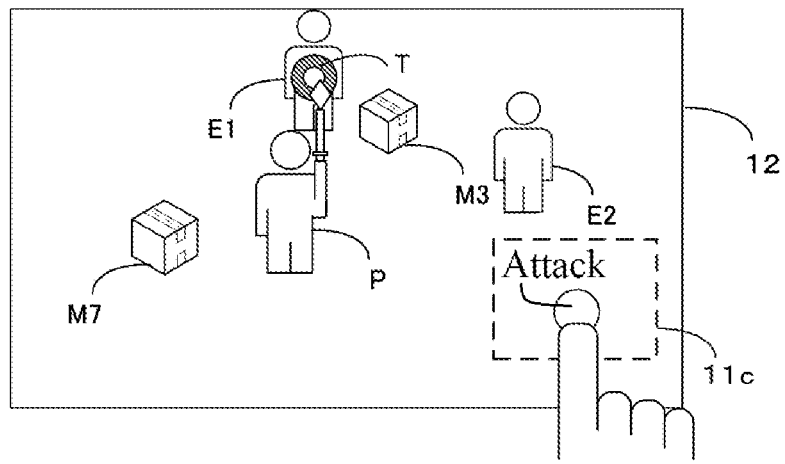

Next, with reference to FIGS. 8A to 8C, an example of the display screen displayed on the display unit 12 when the non-player object on the screen is set (locked on) as the target object during "In battle" will be described. In FIGS. 8A to 8C, the game proceeds in the order of 8A, 8B, and 8C.

Now, during "In battle", as shown in FIG. 5A, the player object P, and the enemy objects E1, E2, E4, E5 and the material objects M3, M6, M7, M8 as the non-player objects are arranged, and the virtual camera CM is arranged in the rear of the player object P in the virtual space VS. At this point, as shown in FIG. 8A, the player object P, the enemy objects E1, E2 and the material objects M3, M7 arranged within the imaging range CR are displayed on the display unit 12. Also at this point, the player performs the swipe operation of sliding in the upward direction in the second region 11b of the operating unit 11 as shown in FIG. 8A to align with the player input direction (the direction indicated by the arrow D) in FIG. 5A.

Next, as shown in FIG. 8B, when the player performs the specific operation (also serving as the attack operation) of touching the icon image indicating "Attack" in the third region 11c of the operating unit 11, one non-player object is set as the target object among the non-player objects. Specifically, the specific range IR is set with the player input direction in FIG. 5A (the direction indicated by the arrow D) as the center axis specified corresponding to the sliding direction of the swipe operation in FIG. 8A. Then, the priority is set for each of the plurality of non-player objects shown in FIG. 5A with reference to the in battle priority setting table in FIG. 6, thus the highest priority "1" is set as the priority of the enemy object E1. The (on-screen) non-player object (enemy object E1) displayed on the display unit 12 is set as the target object, and the aim image T is displayed to be superimposed on the enemy object E1 as shown in FIG. 8B.

Next, as shown in FIG. 8C, the player object P attacks the enemy object E1 as the target object with the aim image T superimposed and displayed based on the player performing the specific operation (also serving as the attack operation) in FIG. 8B. In the game progress shown in FIGS. 8B to 8C, the player object P and the target enemy object E1 remain to be displayed on the display unit 12, constantly included within the imaging range CR until the setting of the target object is canceled. Therefore, the player can always keep viewing the target object while operating the player object P, and the operability of the player can be improved.

As described above, when the player attacks the plurality of non-player objects as the targets, the target of the attack is fixed to (lock on) one non-player object on the screen simply by performing a tap operation as an attack operation and can attack the target object. Therefore, the operability of the player can be improved.

(Example of Changing Imaging Range of Virtual Camera During "in Battle")

Next, with reference to FIGS. 9A and 9B, an example of the imaging range CR of the virtual camera CM switched during "In battle" will be described.

Now, during "In battle", it is assumed that the player object P attacks and defeats the enemy objects E1, E2, E4 and destroys the material object M3 from the non-player object arrangements in FIG. 5A. Then, the enemy objects E1, E2, E4 and the material object M3 are removed, and as shown in FIG. 9A, the player object P, and the enemy object E5 and the material objects M6, M7, M8 as the non-player objects are arranged, and the virtual camera CM is arranged in the rear of the player object P in the virtual space VS.

Figure 9A:
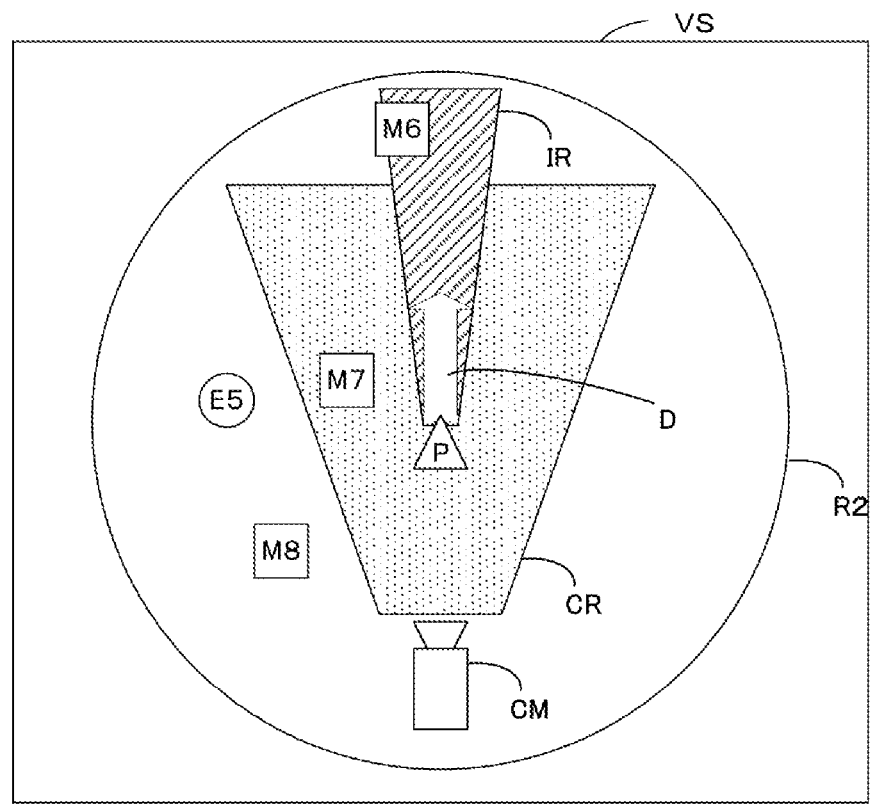
FIGS. 9A and 9B are diagrams for describing an example of switching the imaging range of the virtual camera when in battle.

At this time, the priority is set for each of the plurality of non-player objects in FIG. 9A by the player's specific operation. Specifically, with reference to the in battle priority setting table in FIG. 6, the fifth highest priority "5" is set to the enemy object E5 arranged within the battle region R2, and outside the imaging range CR and the specific range IR. The sixth highest priority "6" is set to the material object M6 arranged within the battle region R2, outside the imaging range CR and within the specific range IR. The seventh highest priority "7" is set to the material object M7 arranged within the battle region R2 and the imaging range CR, and outside the specific range IR. The lowest priority "8" is set to the material object M8 arranged within the battle region R2, and outside the imaging range CR and the specific range IR. Accordingly, the enemy object E5 having the highest priority is set as the target object over the plurality of non-player objects in the example shown in FIG. 9A.

However, as shown in FIG. 9A, the enemy object E5 is not displayed on the display unit 12 due to the arrangement outside the imaging range CR. In view of this, when the enemy object E5 is set as the target object, the virtual camera CM changes the imaging direction and an imaging position so as to include the enemy object E5 as the target object within the imaging range CR as shown in FIG. 9B. Accordingly, the imaging range CR is changed to include the enemy object E5 within the imaging range CR.

(Example of Locking on Off-Screen Non-Player Objects During "in Battle")

Figure 10A:
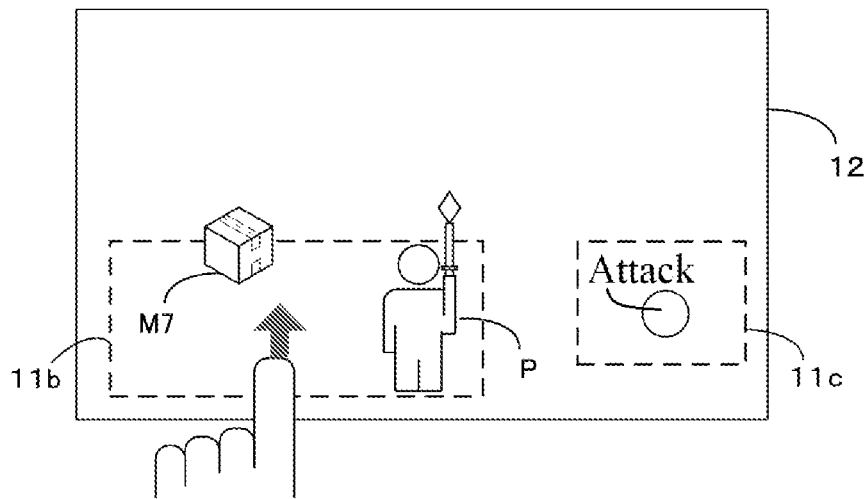
FIGS. 10A, 10B, and 10C are diagrams for describing an example of the target object setting for an off-screen non-player object when in battle.
Figure 10B:
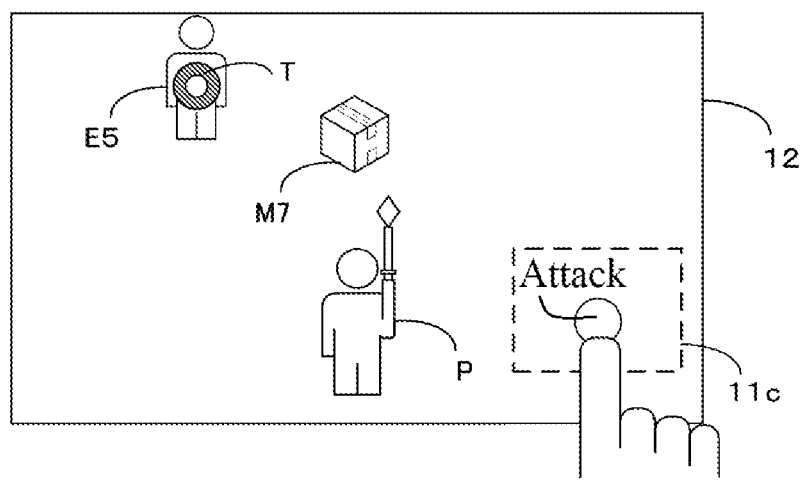
Figure 10C:
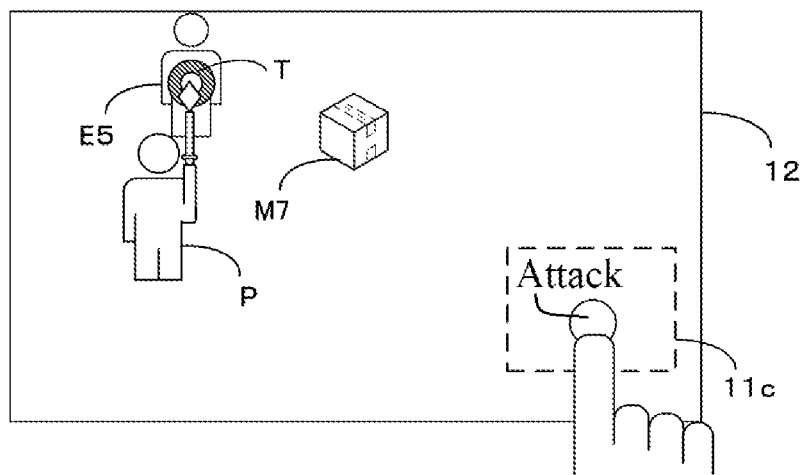

Next, with reference to FIGS. 10A to 10C, an example of the display screen displayed on the display unit 12 when an off-screen non-player object is set (locked on) as the target object during "In battle" will be described. In FIGS. 10A to 10C, the game proceeds in the order of 10A, 10B, and 10C.

Now, during "In battle", as shown in FIG. 9A, the player object P, the enemy object E5 and the material objects M6, M7, M8 as the non-player objects are arranged, and the virtual camera CM is arranged in the rear of the player object P in the virtual space VS. At this point, as shown in FIG. 10A, the player object P and the material object M7 arranged within the imaging range CR are displayed on the display unit 12. Also at this point, the player performs swipe operation of sliding in the upward direction in the second region 11b of the operating unit 11 as shown in FIG. 10A so as to be in the player input direction (the direction indicated by arrow D) in FIG. 9A.

Next, as shown in FIG. 10B, one of the plurality of non-player objects is set as the target object by the player's specific operation (also serving as the attack operation) of touching the icon image indicating "Attack" in the third region 11c of the operating unit 11. Specifically, the specific range IR is set with the player input direction in FIG. 9A (the direction indicated by the arrow D) as the center axis specified corresponding to the sliding direction of the swipe operation shown in FIG. 10A. Then, the priority is set for each of the plurality of non-player objects in FIG. 9A with reference to the in battle priority setting table in FIG. 6, and the priority "5", which is higher than the priority of other non-player objects, is set to the enemy object E5. Accordingly, the (off-screen) non-player object (the enemy object E5), which is not displayed on the display unit 12, is set as the target object. Then, when the enemy object E5 is set as the target object, the imaging direction and the imaging position of the virtual camera CM are changed such that the enemy object E5 is included within the imaging range CR as shown in FIG. 9B. Accordingly, as shown in FIG. 10B, the enemy object E5 is displayed on the display unit 12 with the aim image T superimposed and displayed on the displayed enemy object E5.

Next, by the player's specific operation (also serving as the attack operation) in FIG. 10B, the player object P attacks the enemy object E5 as the target object on which the aim image T is superimposed and displayed as shown in FIG. 10C. In the game progress shown in FIGS. 10B to 10C, the player object P and the target enemy object E5 remain to be displayed on the display unit 12 until the setting of the target object is canceled. In view of this, while operating the player object P, the player can easily lock onto the off-screen non-player object, which is not in player's view, and confirm the locked-on target object. Therefore, the operability of the player can be improved.

As described above, when the player attacks the plurality of non-player objects, the tap operation as the attack operation alone allows the player to fix (lock on) one of the off-screen non-player objects as the target object, and then to attack the target object. Therefore, the operability of the player can be improved.

As described above, according to this embodiment as described using FIGS. 10A to 10C, the (off-screen) non-player object which is not displayed on the display unit 12 due to the arrangement outside the imaging range CR can be set (locked on) as the target object during "In battle". Therefore, the player can lock on the non-player object without displaying it on the display unit 12 temporarily, so that the operability of the player can be improved.

Figure 9B:
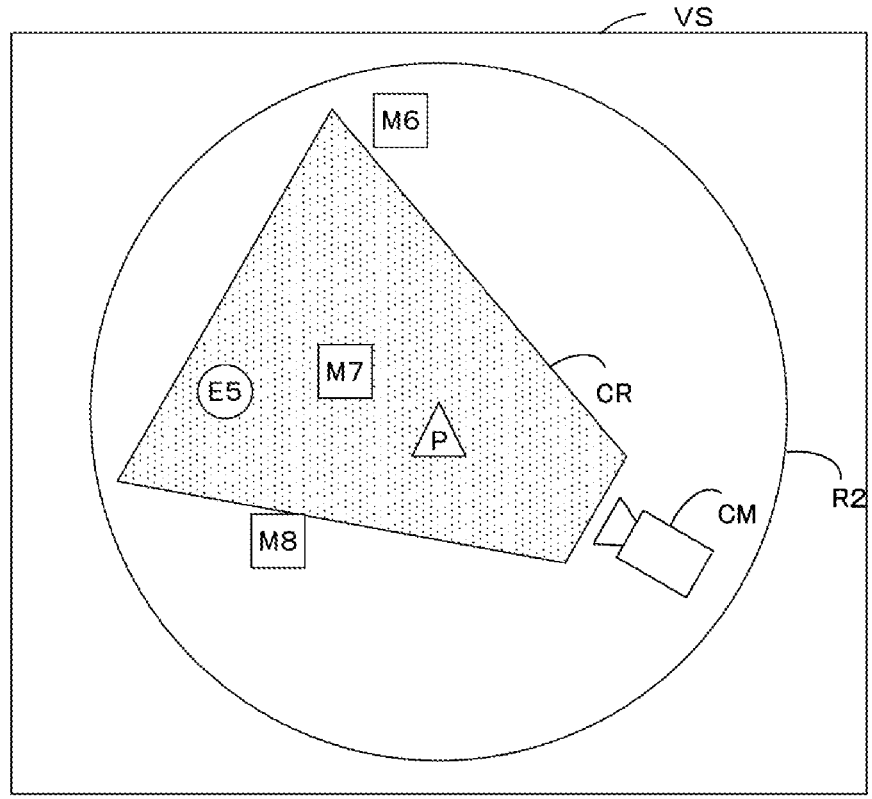

As described using FIG. 7 (Step S13) and FIGS. 9A and 9B, when the (off-screen) non-player object, which is not displayed on the display unit 12 due to the arrangement outside the imaging range CR, is set (locked on) as the target object during "In battle", the imaging range and the like of the virtual camera CM is changed such that the target object is included in the imaging range CR. In view of this, even if a non-player object which is not displayed on the display unit 12 is set as the target object, the target object can be immediately visually recognized. Furthermore, when the off-screen non-player object is set as the target object, the non-player object that is not found (displayed) on the display unit 12 can be found (displayed) on the display unit 12. Therefore, the operability of the player can be improved.

As described using FIG. 7 (Step S12) and FIGS. 8A to 8C, when the (on-screen) non-player object displayed on the display unit 12 due to the arrangement within the imaging range CR is set (locked on) as the target object during "In battle", the imaging range and the like of the virtual camera CM is controlled such that the target object remains to be included in the imaging range CR. In view of this, once the non-player object displayed on the display unit 12 is set as the target object, the non-player object remains to be displayed on the display unit 12 in a period while the non-player object is set as the target object. Therefore, the attack or the like on the target object can be easily performed and the operability of the player can be improved.

As described using FIGS. 5A and 5B, and FIG. 6, when switching from "Out of battle" to "In battle", the battle region R2 is formed, and the moving range of the player object P is limited in the battle region R2. Then, by setting the priority for all the non-player objects arranged within this battle region R2, even the non-player objects arranged outside the imaging range CR can be set as the target object. Accordingly, since the non-player object arranged within the range where the player object P can move is set as the target object, the operability of the player can be improved in the moving and attacking operations of the player object.

As described using FIG. 7, based on the player's specific operation (see Step S1), the priority is set for each of the plurality of non-player objects with reference to the out of battle priority setting table in FIG. 4 or the in battle priority setting table in FIG. 6 (see Steps S3 to S7). Then, the non-player object having the highest priority is set as the target object (see Step S8). Therefore, the most suitable non-player object for the player can be set as the target object, and the operability of the player can be improved.

As described using FIGS. 4, 6, and 7 (Steps S6, S7), the priorities are set to the non-player objects using different priority setting tables according to whether it is "In battle" or "Out of battle", that is, whether or not the moving range of the player object P is limited within the battle region R2. Thus, the priorities can be set using the different criteria for the non-player objects depending on the situation (whether or not the movement of the player object P is limited). Therefore, the most suitable non-player object can be set as the target object, and the operability of the player can be improved.

As described using FIGS. 5A and 5B and FIG. 6, when the moving range of the player object P is limited within the battle region R2 ("In battle"), among the plurality of non-player objects arranged within the battle region R2 and the imaging range CR (the enemy objects E1, E2 and the material objects M3, M7 in FIGS. 5A and 5B), the enemy objects E1, E2 are set to the higher priorities ("1", "2") than the priorities ("3", "7") of the material objects M3, M7. Therefore, since the enemy object E can be preferentially set as the target object than the material object M, the operability of the player in the action game to defeat enemies can be improved.

As described using FIGS. 5A and 5B and FIG. 6, when the moving range of the player object P is limited within the battle region R2 ("In battle"), among the plurality of enemy objects (the enemy objects E1, E2 shown in FIGS. 5A and 5B) arranged within the battle region R2 and the imaging range CR, the enemy object E1 arranged within the specific range IR is set to the higher priority ("1") than the priority ("2") of the enemy object E2 arranged outside the specific range IR. Accordingly, the enemy object E close to the player input direction can be preferentially set as the target object even if the enemy objects E similarly arranged within the imaging range CR. Therefore, the target object can be set by reflecting the player's operational intention, and the operability of the player can be improved.

As described using FIGS. 5A and 5B and FIG. 6, when the moving range of the player object P is limited within the battle region R2 ("In battle"), the enemy objects (the enemy objects E4, E5 shown in FIGS. 5A and 5B) arranged within the battle region R2 and outside the imaging range CR are set to the higher priorities ("4", "5") than the priority ("7") of the material object (the material object M7 in FIGS. 5A and 5B) arranged within the battle region R2 and the imaging range CR and outside the specific range IR. Accordingly, even when the enemy object E is arranged outside the imaging range CR, the enemy object E can be preferentially set as the target object. Therefore, the operability of the player in the action game to defeat enemies can be improved.

As described using FIGS. 8A to 8C and FIGS. 10A to 10C, when one of the plurality of non-player objects is set as the target object, only the target object is attacked based on the player's attack operation. Accordingly, since the object (target) can be fixed (locked on) to one object when performing an attack operation, the operability of the player can be improved.

The above description is provided for the embodiment of the present invention. The present invention is not limited to the embodiment as described above; it may be changed as shown in the following examples, and the combination of a plurality of modifications may also be possible within the scope of the gist of the present invention.

(Modifications)

In the above description, the predetermined condition to form the battle region R2 as shown in FIG. 5A is switching from "Out of battle" to "In battle", but not limited thereto. For example, the player's specific operation or the presence of a particular non-player object may also be configured as a predetermined condition to form the battle region R2.

In the above description, as described using FIG. 7, the specific condition is satisfied by performing the specific operation to lock on (see Step S1), which also functions as the attack operation (see Step S14). Alternatively, the specific operation and the attack operation may be different operations. For example, the tap operation (lock on operation) to touch an icon image indicating "Lock on" in the third region 11c of the operating unit 11 may be performed as the specific operation. That is, the specific condition is not limited to be satisfied based on the attack operation, and the specific condition may be satisfied based on the lock-on operation based on the lock on operation. In this case, a process of determining whether the attack operation is performed is added after Step S10 in FIG. 7, and the attack action is executed when the attack operation is performed.

In the above description, although the player object P is arranged within the imaging range CR as described in FIGS. 3A and 3B and FIGS. 5A and 5B, it may be also arranged outside the imaging range CR, and the virtual camera CM may be controlled such that at least the target object is arranged within the imaging range CR.

In the above description, as described using FIGS. 3A to 6, the specific range IR is set to have the player input direction as the center axis, the priorities for the non-player objects are set based on the specific range IR, that is, the priorities for the non-player objects are set on the premise that the player input direction is detected. However, when the player input direction is not detected without the player's swipe operation or the like in the second region 11b of the operating unit 11, the specific range IR may be set based on the current direction of the player object P (for example, its facing direction) as the center axis. Alternatively, when the player input direction is not detected, it can be assumed that the specific range IR is not set so that all the non-player objects may be treated as those arranged outside the specific range IR. In this case, for example, any one of the priorities "2", "5", "7", and "8" in the in battle priority setting table in FIG. 6 may be set. Therefore, the accuracy of setting the priority is lower than that in the case where the player input direction is detected, but the control load of the control unit 10 (CPU) or the like can be reduced.

In the above description, as described using FIG. 7, when the setting of the target object is canceled by defeating the target object (see Step S10; YES), the priority setting is reset (see Step S16). That is, when one non-player object is set as the target object and then the setting of the target object is canceled, all the settings for priorities including the priorities already set to other non-player objects are reset. Accordingly, in the above description, the specific operation by the player is performed again (the specific condition is satisfied) after the setting of the target object is canceled, so that the aim setting process in FIG. 7 is performed again and the priority of each of the plurality of non-player objects is set again. However, in other embodiments, when the specific condition is satisfied and the priority is set for each of the plurality of non-player objects, even if the set target object is defeated, the priority setting may not be reset until all the plurality of non-player objects (or all the plurality of enemy objects E) are defeated. In this case, the setting of the target object can be switched based on the player's predetermined switching operation, and when there is no switching operation and the setting of the target object is canceled, the non-player object with the high priority may automatically be set as the target based on the priorities already set to other non-player objects.

In the above description, as described using FIGS. 3A and 3B and FIGS. 5A and 5B, the priorities are set according to whether the non-player objects are arranged within or outside the specific range IR. As to the priorities of the non-player objects of the same type within the specific range IR and imaging range CR, the high and low thereof are not mentioned above. In this case, even when the non-player objects are arranged within the same specific range IR, the non-player object arranged closer to the player input direction may be set with the higher priority. Similarly, as to the plurality of the non-player objects arranged within the same imaging range CR under the same other conditions, the non-player object arranged closer to the player object P may be set with the higher priority.

In the above description, as described using FIG. 5A, although the non-player objects are all arranged within the battle region R2 during "In battle", the non-player objects may be arranged outside the battle region R2. Furthermore, in this case, the priority of the non-player objects arranged outside the battle region R2 may be set to be the lowest.

In the above description, as shown in FIG. 1, although game programs and various game data are distributed from the server apparatus to the information processing device 1 via the communication unit 15, they may be stored in the memory unit 14 of the information processing device 1. In this case, the configuration of the communication unit 15 may be omitted.

In the above description, the information processing device 1 as shown in FIG. 1 is a portable terminal device, such as a smart phone, and not limited thereto. For example, it may be a personal computer, game equipment of a stationary type, or the like.

In the above description as shown in FIG. 1, although the information processing device 1 includes the operating unit 11, the operating unit 11 may be provided separately from the information processing device 1. For example, the operating unit 11 may be a game controller, a keyboard, a computer mouse, or the like connected to the information processing device 1 externally. Similarly, the display unit 12 may be provided separately from the information processing device 1, for example, it may be a display unit or the like connected to the information processing device 1 externally. Similarly, the memory unit 14 may be provided separately from the information processing device 1, for example, it may be external storage medium such as a flash memory, a magnetic disk, an optical disk.

The aim setting process shown in FIG. 7 illustrates an example of the present invention, which allows the changes of the order, addition of steps, omission of a part of steps unless these changes deviate from the scope of the present invention.

The above description is provided for the embodiments and modifications in the present invention. The following describes various kinds of configurations included in the present invention.

That is, an information processing program for causing a computer of an information processing device (for example, information processing device 1) to execute an information process according to an operation to an operating unit (for example, operating unit 11) and cause a display unit to display an image (for example, display unit 12). The program causes the computer to function as: a camera control unit (for example, virtual camera control unit 103) that controls an imaging range or an imaging direction of a virtual camera in a virtual space; a display control unit (for example, display control unit 107) that causes the display unit to display an image taken by the virtual camera; an action control unit (for example, player object control unit 104) that controls an action of a player object in the virtual space according to an operation to the operating unit; and a setting unit (for example, target object setting unit 106) that sets any one of a plurality of non-player objects other than the player object as a target object to aim. The setting unit is capable of setting the non-player object arranged outside the imaging range of the virtual camera to be set as the target object. This configuration improves the operability of the player in that any operation of displaying the non-player object on the display unit temporarily is not required to perform the target object setting for the non-player object even outside the imaging range of the virtual camera (namely, the one not displayed on the display unit). Also, since the non-player object the non-player object that is not displayed on the display unit can be set as the target object without being temporarily displayed on the display unit, the processing load of the computer can be reduced when setting the target object.

The camera control unit changes the imaging range or the imaging direction of the virtual camera such that at least the target object is included within the imaging range when the setting unit sets the non-player object arranged outside the imaging range of the virtual camera as the target object. This configuration allows the player to identify the target object visually immediately even when the non-player object not displayed on the display unit due to the arrangement outside the imaging range of the virtual camera is set as the target object. This configuration also improves the operability of the player in that the (off-screen) non-player object yet to be found can be identified (displayed on the screen) when the target object is set.

The setting unit is capable of setting the non-player object arranged within the imaging range of the virtual camera as the target object, and when the setting unit sets the non-player object arranged within the imaging range of the virtual camera as the target object, the camera control unit controls the imaging range or the imaging direction of the virtual camera such that at least the target object remains to be included within the imaging range in a period while the target object is set. According to this configuration, because the non-player object displayed on the display unit due to the arrangement within the imaging range of the virtual camera is set as the target object, and then it is constantly displayed on the display unit during the time of the setting of the target object, it becomes easy to attack the target object and the operability of the player can be improved.

The action control unit limits the moving range of the player object to a predetermined range broader than the imaging range of the virtual camera in the virtual space based on a predetermined condition (for example, switched from "Out of battle to In battle"), and the setting unit is capable of setting the non-player object arranged within the predetermined range and outside the imaging range of the virtual camera as the target object. This configuration reduces computer processing loads, because the non-player object that can be set as the target object can be limited within the predetermined range where the player object's movement is limited. Since the non-player object arranged within the range where the player object can move is set as the target object, this configuration also improves the operability of the player in the moving and attacking operation of the player object.

The program causes the computer to further function as a priority setting unit (for example, priority setting unit 105) that sets a priority for each of the plurality of non-player objects according to an operation to the operating unit (for example, specific operation). The setting unit compares each of the priorities of the plurality of non-player objects set by the priority setting unit to set the non-player object with a highest priority as the target object. This configuration improves the operability of the player, because the most suitable non-player object from the player's point of view is set as the target object.

The priority setting unit sets priorities to the non-player objects using different criteria (for example, different priority setting tables) according to whether the moving range of the player object is limited within the predetermined range (for example, during "In battle") or not (for example, "Out of battle") by the action control unit. This configuration improves the operability of the player, because the most suitable non-player object depending on the situation is set as the target object.

The non-player objects include a movable enemy object and a static material object, and the priority setting unit sets a priority for each of plurality of non-player objects arranged within the predetermined range when the action control unit limits the moving range of the player object within the predetermined range, and sets a higher priority to the enemy object than a priority of the material object of the plurality of non-player objects arranged within the imaging range of the virtual camera. This configuration improves the operability of the player in the action game to defeat enemies, because the enemy object can be set with priority over the material objects.

The action control unit causes the player object to act toward a predetermined input direction based on an operation for indicating the predetermined input direction to the operating unit; and the priority setting unit sets a higher priority to an enemy object arranged within a specific range based on the predetermined input direction than a priority of an enemy object arranged outside the specific range, among the plurality of enemy objects arranged within the imaging range of the virtual camera. This configuration improves the operability of the player by reflecting the player's operational intention, because the enemy objects arranged within the specific range can be set with priority over those arranged outside the specific range.

The priority setting unit sets a higher priority to an enemy object arranged outside the imaging range of the virtual camera than a priority of the material object arranged within the imaging range of the virtual camera and outside the specific range. This configuration improves the operability of the player in the action game to defeat enemies, because the enemy object can be set as the target object with priority even when they are arranged outside the imaging range of the virtual camera.

When the setting unit sets the target object, the action control unit causes the player object to perform the attack action against the target object with the operation in the operating unit (for example, the attack operation). This configuration improves the operability of the player, because the attack target can be fixed to (lock on) one when performing an attack operation.

The application of the present invention is also possible to information processing methods and information processing programs.

The above description where the present invention has been described only illustrates an example of the present invention and opens to various kinds of improvements and modifications. The effects described in the embodiments are presented as a list of the preferred effects in the present invention and not limited thereto.

DESCRIPTION OF REFERENCE SIGNS

1 Information processing device
10 Control unit
11 Operating unit
12 Display unit
13 Speaker
14 Memory unit
15 Communication unit
100 Bus
101 Operation detecting unit
102 Arrangement unit
103 Virtual camera control unit
104 Player object control unit
105 Priority setting unit
106 Target object setting unit
107 Display control unit
108 Audio control unit

What is claimed is:

1. A non-transitory computer-readable medium having stored thereon an information processing program for causing a computer of an information processing device to execute an information process according to an operation to an operating unit and cause a display unit to display an image, the information processing program causing the computer to function as:
a camera control unit that controls an imaging range or an imaging direction of a virtual camera in a virtual space;
a display control unit that causes the display unit to display an image taken by the virtual camera;
an action control unit that controls an action of a player object in the virtual space according to the operation to the operating unit; and
a setting unit that sets any one of a plurality of non-player objects other than the player object as a target object to aim at,
wherein:
the setting unit is capable of setting the non-player object arranged outside the imaging range of the virtual camera as the target object; and
the action control unit controls the action of the player object such that a predetermined effect acts on the target object when the non-player object arranged outside the imaging range of the virtual camera is set as the target object.

2. The non-transitory computer-readable medium according to claim 1, wherein the camera control unit changes the imaging range or the imaging direction of the virtual camera such that at least the target object is included within the imaging range of the virtual camera when the setting unit sets the non-player object arranged outside the imaging range of the virtual camera as the target object.

3. The non-transitory computer-readable medium according to claim 1, wherein:
the setting unit is capable of setting the non-player object arranged within the imaging range of the virtual camera as the target object; and
when the setting unit sets the non-player object arranged within the imaging range of the virtual camera as the target object, the camera control unit controls the imaging range or the imaging direction of the virtual camera such that at least the target object remains to be included within the imaging range of the virtual camera in a period while the target object is set.

4. The non-transitory computer-readable medium according to claim 1, wherein:
the action control unit limits a moving range of the player object to a predetermined range broader than the imaging range of the virtual camera in the virtual space based on a predetermined condition; and
the setting unit is capable of setting the non-player object arranged within the predetermined range and outside the imaging range of the virtual camera as the target object.

5. The non-transitory computer-readable medium according to claim 4, wherein:
the information processing program causes the computer to further function as a priority setting unit that sets a priority for each of the plurality of non-player objects according to the operation to the operating unit; and
the setting unit compares the priority for each of the plurality of non-player objects set by the priority setting unit to set the non-player object with a highest priority as the target object.

6. The non-transitory computer-readable medium according to claim 5, wherein
the priority setting unit sets the priority for each of the plurality of non-player objects using different criteria according to whether the moving range of the player object is limited within the predetermined range or not by the action control unit.

7. The non-transitory computer-readable medium according to claim 5, wherein:
the non-player objects include a movable enemy object and a static material object; and
the priority setting unit:
sets the priority for each of the plurality of non-player objects arranged within the predetermined range when the action control unit limits the moving range of the player object within the predetermined range; and
sets the priority of the movable enemy object higher than the priority of the static material object among the plurality of non-player objects arranged within the imaging range of the virtual camera.

8. The non-transitory computer-readable medium according to claim 7, wherein:
the movable enemy object is one of a plurality of movable enemy objects including a first movable enemy object and a second movable enemy object;
the action control unit causes the player object to act toward a predetermined input direction based on the operation to the operating unit which indicates the predetermined input direction; and the priority setting unit sets the priority of the first movable enemy object which is arranged within a specific range based on the predetermined input direction higher than the priority of the second movable enemy object which is arranged outside the specific range, among the plurality of movable enemy objects arranged within the imaging range of the virtual camera.

9. The non-transitory computer-readable medium according to claim 8, wherein the priority setting unit sets the priority of the second movable enemy object arranged outside the imaging range of the virtual camera higher than the priority of the static material object arranged within the imaging range of the virtual camera and outside the specific range.

10. An information processing device for information processing according to an operation to an operating unit and causing a display unit to display an image, the information processing device comprising:

a computer; and a non-transitory computer-readable medium having stored thereon an information processing program that, when executed by the computer, causes the computer to function as:

a camera control unit that controls an imaging range or an imaging direction of a virtual camera in a virtual space;

a display control unit that causes the display unit to display an image taken by the virtual camera;

an action control unit that controls an action of a player object in the virtual space according to the operation to the operating unit; and a setting unit that sets any one of a plurality of non-player objects other than the player object as a target object to aim at, wherein:

the setting unit is capable of setting the non-player object arranged outside the imaging range of the virtual camera as the target object; and the action control unit controls the action of the player object such that a predetermined effect acts on the target object when the non-player object arranged outside the imaging range of the virtual camera is set as the target object.

11. An information processing method executed by a computer of an information processing device for information processing according to an operation to an operating unit and causing a display unit to display an image, the information processing method comprising:

executing, by the computer, an information processing program stored on a non-transitory computer-readable medium that causes the computer to perform:

controlling an imaging range or an imaging direction of a virtual camera in a virtual space;

causing the display unit to display an image taken by the virtual camera;

controlling an action of a player object in the virtual space according to the operation to the operating unit; and setting of any one of a plurality of non-player objects other than the player object as a target object to aim at, wherein:

the non-player object arranged outside the imaging range of the virtual camera can be set as the target object; and the action of the player object is controlled such that a predetermined effect acts on the target object when the non-player object arranged outside the imaging range of the virtual camera is set as the target object.

* * * * *